Nov. 2, 1971 T. O. PAINE, ACTING 3,616,528
ADMINISTRATOR OF THE NATIONAL AERONAUTICS
AND SPACE ADMINISTRATION
SOLID STATE MATRICES

Filed Nov. 15, 1968 2 Sheets-Sheet 1

INVENTORS.
WALTER A. HASBACH
JOHN V. GOLDSMITH
BY
ATTORNEYS.

Nov. 2, 1971 T. O. PAINE, ACTING 3,616,528

ADMINISTRATOR OF THE NATIONAL AERONAUTICS AND SPACE ADMINISTRATION

SOLID STATE MATRICES

Filed Nov. 15, 1968 2 Sheets-Sheet 2

INVENTORS.
WALTER A. HASBACH
JOHN V. GOLDSMITH

BY

ATTORNEYS.

United States Patent Office 3,616,528
Patented Nov. 2, 1971

3,616,528

SOLID STATE MATRICES

T. O. Paine, Acting Administrator of the National Aeronautics and Space Administration, with respect to an invention of Walter A. Hasbach, West Covina, and John V. Goldsmith, Glendale, Calif.

Filed Nov. 15, 1968, Ser. No. 776,185
Int. Cl. B01j 17/00; H01c 7/08; H01j 9/00
U.S. Cl. 29—572 7 Claims

ABSTRACT OF THE DISCLOSURE

An electrically-connected matrix of discrete solar cell blanks is disclosed. Electrode contact receiving areas are provided on the light-sensitive surface of each blank and discrete continuous conducting layers are directly attached to said contact areas and extend between at least two of said blanks to form integral electrode contacts on and interconnections between said blanks. The cell blanks are disposed in separated, adjacent, side-by-side arrangements with their light-sensitive faces lying in substantially the same plane. Bridges for supporting the interconnection are placed in the separations. Portions of the blanks are masked and metal is deposited through said mask onto said bridges and surfaces to form integral electrode contacts on and interconnections between said separated blanks.

ORIGIN OF THE INVENTION

The invention described herein was made in the performance of work under a NASA contract and is subject to the provisions of Sec. 305 of the National Aeronautics and Space Act of 1958, Public Law 85-568 (72 Stat. 435; 42 USC 2457).

BACKGROUND OF THE INVENTION

(1) Field of the invention

The present invention relates to fabrication of matrices of semi-conductor elements, and more particularly, the invention relates to the simultaneous production of contacts and interconnections between solar cell blanks to form a solar battery submodule.

(2) Description of the prior art

There are a variety of energy sensitive devices that are extensively utilized to convert energy from one form to another; for example, solar cells have been successfully employed to convert incident solar radiation energy into electrical energy. Solar cell blanks are fabricated as slices cut from specially prepared single crystal semiconductor ingots. As would be expected, power capability of a solar cell is proportional to its radiation collection area. However, due to manufacturing limitations in processing single crystal semi-conductor ingots, the collection area must be restricted to relatively small unit sizes. Thus, the power output produced by any single cell is quite limited; and, therefore, the cells must be grouped into matrices to provide a power summation at a level suitable for its intended use.

Solar cell energy systems are and will be extensively utilized in outer space investigation to maintain a charge on conventional batteries and to provide direct energization of certain devices. However, complex manufacturing techniques have maintained production costs of solar cell energy systems at a substantial level. For example, present manufacturing techniques involve forming grid lines and an electrode contact on the light-sensitive face in one operation and a contact is provided on the opposite face. After further processing to remove edge contamination which may occur during such operations, an anti-reflective coating is applied to the light-sensitive face. Cells are then laid adjacent to each other and interconnections are soldered between adjacent cells to form a series-parallel matrix having the desired voltage-current output capability. The matrix is subsequently incorporated into modules and the modules into solar power panels.

These steps are believed to be unnecessarily complex. Soldering cell interconnections is not only time-consuming but may also result in damage or degradation of the cell and require subsequent removal of flux. Furthermore, the soldered connections project above the surface and are of non-uniform shape, making it difficult to apply the cover-glass which protects the cell from radiation damage while in space.

Although formation of the second contact on the opposite face of the cell makes available more light-sensitive surface for solar energy collection, it requires separate metal depositing and solder dip operations, and it is difficult, and often impossible, to inspect such contacts after assembly into a solar panel. Furthermore, front to back connecting leads require longer interconnecting wire lengths, adding weight, and increased ohmic resistance and resulting in a decrease in the power to weight ratio of the solar panel. While the increased weight and additional resistance are small for each connection, solar arrays for spacecraft utilize between 10,000 and 40,000 cells for power needs. In the aggregate, these small differences are substantial. Provision of both contacts on the same surface is therefore of advantage in addition to making possible formation of contacts and interconnections in a single operation.

OBJECTS AND SUMMARY OF THE INVENTION

It is therefore an object of this invention to provide a process for efficiently and economically producing solar cell matrices and modules.

A further object is fabrication of contacts and interconnections directly on the surface of solar cell blanks without any intervening metallic layer.

Another object is provision of a process for depositing grid lines, electrode contacts and interconnections directly on the surfaces of a plurality of solar cells without any intervening metallic layer, in a single step, to reduce processing time and manufacturing cost.

These and other objects and attendant advantages will become apparent from the description which follows.

In the most preferred embodiment of the invention, grid lines, both types of electrode contacts and interconnections are simultaneously formed on the same surface of a solar cell blank and at least two blanks are arranged with their edges in spaced relation with a bridge therebetween, and a conductive layer of metal is deposited onto and between the blanks and over the bridge to form low resistance, electrode contacts, grid lines and interconnections in a single step. Metal is selectively applied to the blank surfaces in the desired pattern by covering the surfaces with removable masking, either by painting or by use of a stencil-template member having open areas corresponding to the contacts, grid lines and interconnections. Preferably, the interconnected cells are then subjected to heat treatment to fuse the deposited metal to the cell substrate and to strengthen the bonding and interconnections.

The invention will now become better understood by reference to the following detailed description when considered in conjunction with the accompanying drawings.

DESCRIPTION OF THE PREFERRED EMBODIMENTS

Figures 1, 2, 3:
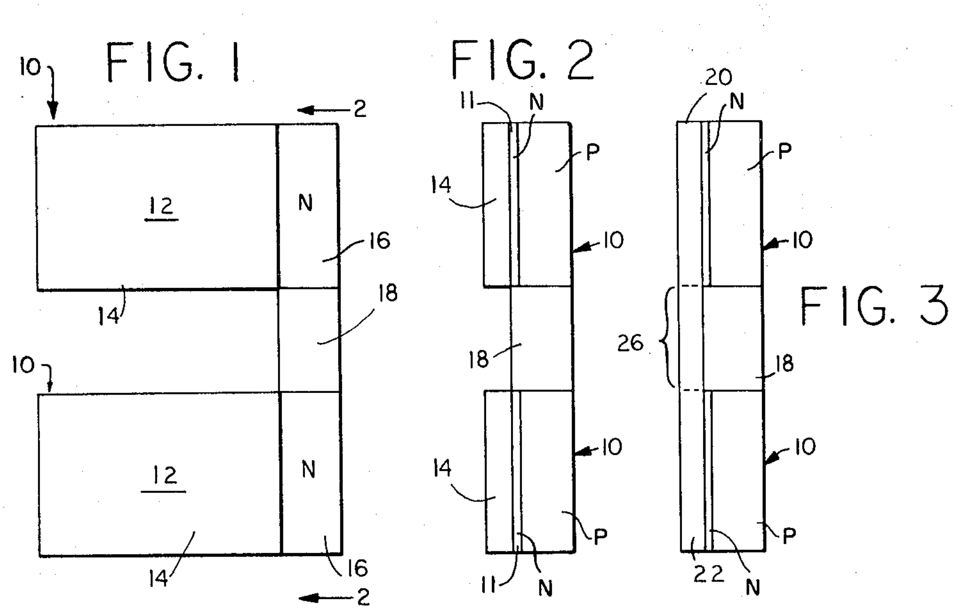
FIG. 1 is a plan view of two solar cell blanks without contacts and grid lines which are arranged adjacent to each other with a bridge interposed between them over which the interconnection between the cells will be formed.
FIG. 2 is an end elevational view of the cell blanks shown in FIG. 1 looking toward line 2—2 of FIG. 1.
FIG. 3 is a view corresponding to FIG. 2 after deposition of metallic contacts directly on the surface of each of the cell blanks and the integral interconnection formed between the cells over the bridge.

Referring now to FIGS. 1 to 3, each cell element 10 comprises a rectangular silicon blank about ¾" square and about 8 mils thick which has been cut from a single crystal of p-type conductivity silicon having an n-conductivity barrier layer 11 formed on the top surface 12 thereof. The light-sensitive areas of the top surface 12 of the blank are covered with a coating 14 of masking material which is resistant to the vapors of the depositing metal and which can be easily removed subsequently without affecting the light-sensitive surface. The non-coated areas 16, which are to form the junctions for the n—n interconnection, are arranged on each side of a bridge element 18 suitably formed of a metal such as copper. The cells with the bridge 18 disposed therebetween are placed in an evacuated chamber such as a bell jar. A source of metal, such as an aluminum-filled crucible, is heated within the jar and the vapors deposit directly onto the exposed silicon areas of the cells and across the bridge.

A continuous, homogenous layer of aluminum, typically about 3 mils in thickness, is deposited to form contacts 20 and 22 on the exposed n-conductivity surface of the blanks with metallic interconnection 26 therebetween. The interconnected cells are then placed in a furnace and raised to sintering temperature to improve metal coherence and adhesion of the contacts and interconnections to the silicon.

The foregoing describes formation of both contacts and a parallel interconnection between n-type surfaces of a pair of silicon solar cell blanks in a single operation. A similar operation could be performed on the p-type opposite surfaces of the blanks in the same manner to produce both electrodes and a second parallel interconnection between the electrode contacts. Alternately, n-p interconnections with other similarly processed cells could be effected by use of the conventional wire or ribbon busses soldered to the contacts formed as described above. It will be noted that the usual grid lines on the light-sensitive surface have been omitted in this example.

Figure 4:
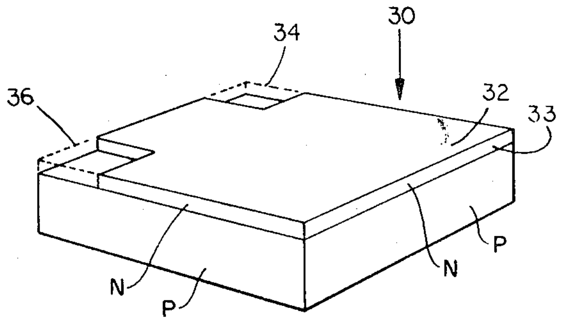
FIG. 4 is a perspective view of a solar cell blank in which the top n-type layer has been etched to expose the underlying p-type layer in two corner areas.

Referring now to FIGS. 4 to 7, solar cell blanks can be fabricated into matrices of solar elements by depositing grid lines, contacts and interconnections on only one surface of two or more cell blanks in a single operation. FIG. 4 shows one diffused silicon blank 30 which is a slice cut from a p-type single crystal. Top surface 32 has been doped with an n-type donor impurity to form an n barrier layer 33, and areas 34 and 36 on opposite corners of the blank have been acid etched to remove the n-type impurity barrier layer to expose the underlying p-type conductivity material on which electrode contacts will be formed.

Figures 5, 6:
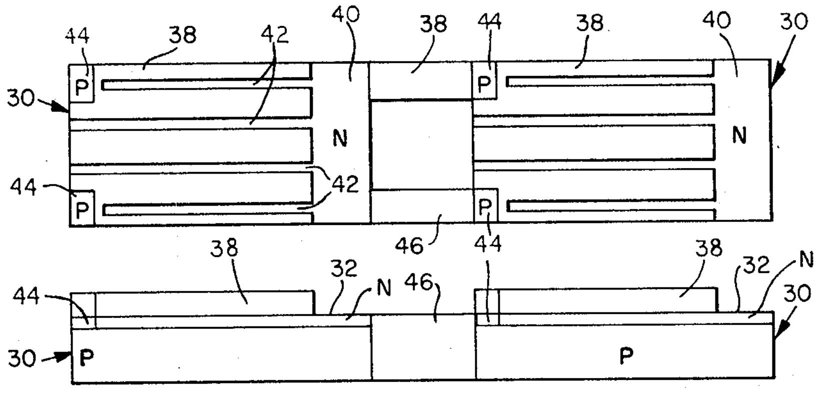
FIG. 5 is a plan view of two solar cell blanks as shown in FIG. 4, arranged in-line, end-to-end, with the etched p-type areas of one cell blank adjacent the n-type layer of the other blank, with a bridge disposed between their adjacent ends, and with masking applied as explained below.
FIG. 6 is a side elevational view of the cell blanks shown in FIG. 5.
Figure 7:
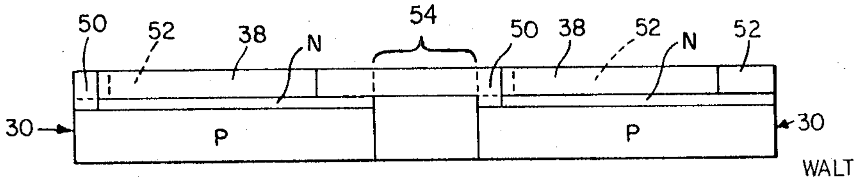
FIG. 7 is a view corresponding to FIG. 6 after deposition of metal on the surfaces of both blanks of electrode contacts, grid lines and interconnections over the bridge.

Referring now to FIGS. 5 to 7, top surface 32 of each of the blanks has been coated with a film 38 of masking materal which may be applied by well known photographic or stencil techniques to form opening 40 for one electrode contact which extends along one end of each blank, and a series of perpendicular grid line openings 42 joined to opening 40 extending across the face of the blank. Openings 44 are provided at opposite corners for formation of second electrode contacts. A pair of blanks 30 is arranged end to end with the p-type exposed areas facing the n-type exposed area of the adjacent blank. Bridges 46 are disposed between the p-type areas 44 and the n-type area 40 of the adjacent blank. The bridge surface is arranged to be at substantially the same level as the top surfaces of the blanks. The assembly is placed in an evacuated chamber as discussed above and thermally generated aluminum vapors are deposited on the top surfaces of the blanks. The aluminum vapors condense to form p-type contact electrodes 50, n-type contact electrodes 52 and an interconnection 54 extending therebetween.

Figure 9:
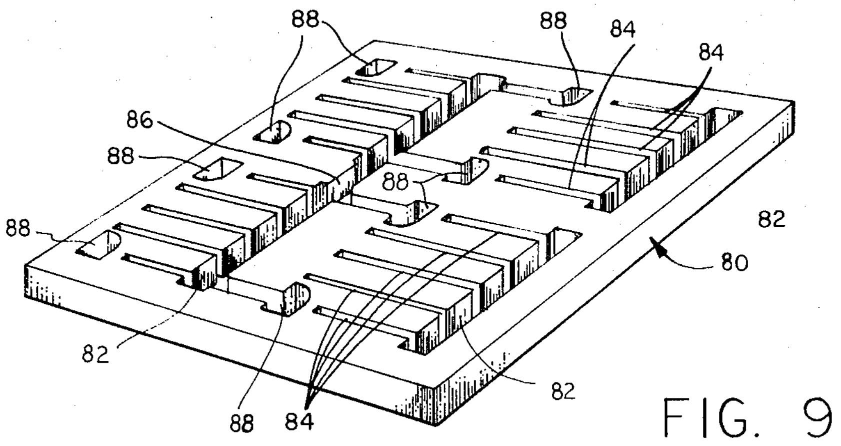
FIG. 9 is a perspective view of a template-stencil member for use with the nesting fixture to deposit electrode contacts, grid lines and interconnections in a single operation.
Figure 8:
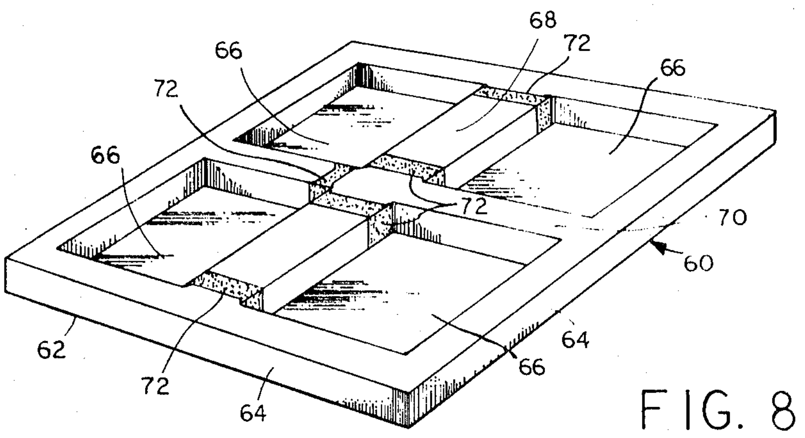
FIG. 8 is a perspective view of a fixture for nesting a plurality of solar cell blanks during processing.
Figure 10:
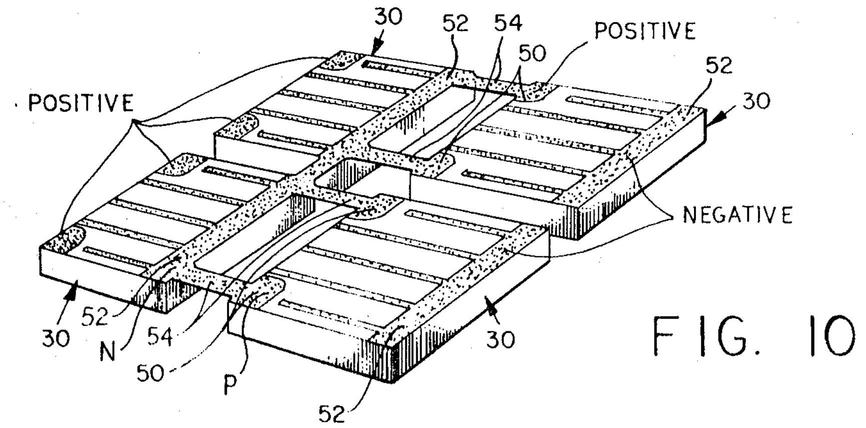
FIG. 10 is a perspective view of a finished matrix of four interconnected solar cell elements fabricated in accordance with the invention disclosed herein.

The process of the invention is readily adaptable to techniques for mass producing matrices of solar elements utilizing apparatus that can be continuously reused to form submodules or modules of solar cells. Referring now to FIGS. 8–10, a fixture member 60 is provided having a bottom wall 62 and exterior end walls 64. Fixture 60 is divided into a plurality of cell nests 66 having dimensions suitable for accommodating individual cell blanks 30, which are formed by intersecting walls 68 and 70. The fixture is fabricated of a relatively high temperature-resistant insulating material such as an epoxy resin. The portions of the side walls corresponding to the locus of the interconnections which are to be provided between the blanks can either be coated or made of a suitable metal to form bridges 72.

The bridges can be made of a material which is inert to the depositing chemical and which will allow the metal deposit to be detached by stripping, regardless of the process employed to deposit the metal. For example, the bridges may be made of a metal which does not readily form an alloy or an adherent bond with the deposited metal or they may be made of a self-lubricating plastic such as Teflon (polytetrafluoroethylene) or nylon (polyamide). Alternatively, the bridges can be formed of a material with which the depositing metal forms an adherent bond. Due to the possibility of thermally-induced expansion and contraction, the attached bridge and interconnection should be of thin cross-section to provide flexibility. The coefficient of expansion of the bridge and interconnection metal should be closely matched. The bridge and interconnection can suitably be formed of the same metal, for example, aluminum.

Blanks 30 are placed in the nests 66 of the fixture member 60 in rows in which the n-type side of the blanks are in alignment and in columns in which the n-type and p-type contact areas of the blanks alternate. In this arrangement, bridges 72 are disposed between the n-type and p-type electrode areas between the columns of blanks and between the n-type conductivity electrode contact areas between alternating rows of blanks.

Referring now to FIG. 9, the template-stencil member 80 is a top member for the fixture 60 having exterior dimensions at least as large as the fixture and containing a series of metal-bearing vapor or liquid receiving openings which correspond to the areas on and between the cells onto which metal is to be deposited. Rectangular apertures 82, provided for forming the n-type contacts on the surface of each element, have a length substantially co-extensive with the length of the blanks and have a width substantially smaller than the width of the blanks. Extending from each of the apertures 82 are a series of comb-like apertures 84 for forming grid lines on the surfaces of the blanks. Several of the interior grid lines extend completely across the blank but the lines near the corners of the blanks must terminate short of the aperture provided for the p-type contact electrode to be provided at those locations. The apertures 82 are joined in the alternating columns to form an aperture 86 to permit access for the metal-bearing chemicals to form the interconnections between the n-type electrodes of the cells.

A further series of openings 88 are provided at locations corresponding to the corners of the cells having p-type conductivity contact areas. The openings 88 extend into apertures 82 to provide access to the bridges 72 to thus form the series-parallel interconnections. The apertures shown are merely representative of those that can be provided.

To produce the matrix, template member 80 is placed over the fixture 60 with four cell blanks 30 nested therein. The assembly is placed in an evacuated chamber, and metal-bearing chemicals are projected through all of the openings to form n-type electrode contacts with the associated grid lines, p-type electrode contacts and interconnections between the n-type electrods and the n-type and p-type electrodes. The matrix of interconnected elements is removed from the fixture and is placed in an oven and heated to sinter the deposited metal to form an adherent and coherent deposit. An anti-reflective coating can then be applied to the light-sensitive non-metal containing areas of the cell elements.

The metal which is to be deposited directly onto the solar cell blank must be compatible with the material of the blank. The metal as it deposits must not disturb the chemical balance of the underlying doped junction. It must deposit to form an adherent low-resistance ohmic contact. Preferably, the deposited interconnection should have sufficient coherence so that the assembly of interconnected cells may be removed from the fixture and can sustain handling without damage to the cells or interconnections.

In the processing of solar cell blanks in which wire or ribbon interconnects have been soldered to the contacts, a titanium-silver mixture has been widely used for forming the electrode contact areas and grid lines. However, aluminum, especially as applied by vacuum metallization from a thermally-evaporated source, will provide an improved ohmic contact in terms of adherence and compatibility with the silicon substrate while still providing farily low resistance interconnections.

Nickel, chromium, cobalt, silver, copper, titanium and zirconium, as well as aluminum, can be deposited by vacuum metallization. Metal deposition may also be effected by other proven techniques. Metal may be deposited from the vapor liquid, or solid phase and may utilize pure metal atoms or mixtures, or metal atoms can be obtained from decomposable metal precursor compounds, such as heat-decomposable or reducible metal salts. Metal may also be deposited by growth from the liquid phase from electrolytic or electroless plating baths.

Processing time for production of matrices of solar elements is substantially reduced by forming both electrode contacts on the same surface of the silicon blank although there is some loss in light-gathering efficiency because of the areas rendered opaque by the deposited metal. The continuous nature of the electrode contacts, grid lines and interconnections and their direct adherence to the silicon surface without any intervening metallic layer provides improved collection of solar energy as compared to the conventional arrangement utilizing previously deposited contacts and subsequently soldered leads. As compared to the prior art, the present approach does not place a plurality of dissimilar materials into contact with the silicon surface and does not produce resistance-creating interfaces.

Packaging efficiency of entire solar cell arrays is substantially increased. Matrices and modules are of reduced weight since the back surface of the cell blanks need not be coated both with metal and solder. Much soldering of interconnections has been eliminated. The back of the elements is now available for use in attaching directly to substrates by adhesives without concern about the integrity of the connections. Blanks can be arranged in closer proximity substantially decreasing the length of interconnections and thus decreasing power loss in the leads.

It is to be understood that only preferred embodiments of the invention have been described and that numerous substitutions, alterations and modifications are all permissible without departing from the scope of the invention as defined in the following claims.

What is claimed is:

1. A method of producing matrices of electrically interconnected solar cells from discrete solar cell blanks of a first conductivity type material having an upper surface layer of opposite conductivity type comprising the steps of:

removing a portion of the upper surface layer along one edge of the blank to form a relieved surface portion exposing the first type of conductivity material;

forming a matrix by disposing a plurality of the cell blanks in separated, adjacent, side-by-side arrangement with their upper surfaces lying in substantially the same plane and with the relieved edge of each blank facing a surface layer portion of opposite conductivity type on another blank;

placing a first bridge in a separation between a set of the blanks adjacent the relieved portion as supports over which series interconnections between cell electrodes are to be formed;

placing a second bridge in a separation between unrelieved surface portions of the same conducting type on a pair of adjacent blanks;

applying a removable mask to the surface of said matrix having a first opening extending over the relieved edge, opposite surface portion of the adjacent blank and first bridge therebetween and a second opening extending over said unrelieved portions of the same conducting type and second bridge therebetween;

applying a source of contact metal vapor to said mask and into said openings to directly deposit onto the exposed surfaces within said first opening a first continuous, homogenous, integral metal layer forming low resistance, electrical, contact electrodes with said relieved portion of first conductivity type and with said adjacent surface portion of opposite conductivity type and an electrical connection on the first bridge therebetween and within said second opening a second, continuous, homogenous, integral metal layer forming contact electrodes with said exposed, adjacent, surface portions of the same conductivity type and an electrical connection on the second bridge therebetween; and heating said layers to sintering temperature to fuse said layers into coherent films adherent to said blanks.

2. A method according to claim 1 in which the conductive contact metal is aluminum and vapors of aluminum are produced in vacuum by thermally evaporating a source of aluminum.

3. A method according to claim 1 in which each blank is a slice of single crystal silicon containing one type of conductivity impurity and in which the upper light sensitive surface of the blank has been treated to introduce an opposite type of conductivity impurity.

4. A method according to claim 1 further including the step of forming a set of comb-like openings in the mask connected to said second opening for simultaneously forming grid lines during deposition of said contact electrodes and interconnections.

5. A method according to claim 2 in which the thickness of the deposited aluminum layer is about 3 mils.

6. A method of producing matrices of electrically interconnected solar cells from discrete solar cell blanks of a first conductivity type material having an upper surface layer of opposite conductivity type comprising the steps of:

removing a portion of the upper surface layer along one edge of the blank to form a relieved portion exposing the first type of conductivity material;

forming a matrix by disposing a plurality of the cell blanks in separated adjacent, side-by-side arrangement with their upper surfaces lying in substantially the same plane and with the relieved edge of each blank facing a surface layer portion of opposite conductivity type on another blank disposing the cell blanks in a fixture member containing a plurality of nests for receiving said cells in spaced side-by-side arrangement and containing a bridge in the wall of at least one of said nests adjacent the relieved portion as a support over which a series interconnection between cell electrodes is to be formed;

applying a removable mask to the surface of said matrix having openings extending over the relieved edge, opposite surface portion of the adjacent blank and bridge therebetween;

applying a source of contact metal vapor to said mask and into said openings to directly deposit onto the exposed surfaces a continuous, homogenous, integral metal layer forming low-resistance electrical contact electrodes with said relieved portion of first conductivity type and with said adjacent surface portion of opposite conductivity type and an electrical interconnection on the bridge therebetween; and heating said layer to sintering temperature to fuse said layer into a coherent film adherent to said blanks.

7. A method according to claim 6 further comprising applying a reusable removable top member for the fixture member as the removable mask during metal deposition.

References Cited

UNITED STATES PATENTS

| | | | |
|---|---|---|---|
| 3,151,379 | 10/1964 | Escoffery | 29—25.3 |
| 3,422,527 | 1/1969 | Gault | 29—572 |
| 3,460,240 | 8/1969 | Tarneja et al. | 29—572 |
| 3,508,324 | 4/1970 | Idzik et al. | 29—590 |

FOREIGN PATENTS

| | | | |
|---|---|---|---|
| 961,486 | 6/1964 | Great Britain | 136—89 |

JOHN F. CAMPBELL, Primary Examiner

D. M. HEIST, Assistant Examiner

U.S. Cl. X.R.

29—576, 578